United States Patent [19]
Wright

[11] 3,831,477
[45] Aug. 27, 1974

[54] SCRAP CUTTER MACHINE

[75] Inventor: Beryle W. Wright, Portland, Oreg.

[73] Assignee: Mill Power Engineering & Manufacturing Co., Portland, Oreg.

[22] Filed: Mar. 19, 1973

[21] Appl. No.: 342,715

[52] U.S. Cl.................. 83/349, 83/509, 83/355, 226/187
[51] Int. Cl............................ B26d 1/56, B23d 25/02
[58] Field of Search............. 83/349, 354, 355, 509; 241/222, 277, 280, 186 R; 226/186, 187, 188

[56] References Cited
UNITED STATES PATENTS
3,224,312  12/1965  Larson................................. 83/355

Primary Examiner—Willie G. Abercrombie
Attorney, Agent, or Firm—Lee R. Schermerhorn

[57] ABSTRACT

A motor-driven flywheel shaft mounts a cutter blade between a pair of flywheels. An identical cutter blade forms an anvil at the discharge end of a horizontal feed tube extending between the two flywheels. A stationary feed roller protrudes through an opening in the bottom of the feed tube and a companion feed roller protrudes through an opening in the top of the feed tube to provide a pair of pinch rolls for feeding elongated pieces of material, such as steel strapping, wire or plastic, which is to be cut into short lengths for storage or disposal. The shafts of the two pinch rolls are equipped with sprocket wheels driven by a chain from a sprocket wheel on a feed drive shaft which is driven by the flywheel shaft. The upper pinch roll is mounted on a rocker frame having pivotal movement on the feed drive shaft. Chain tension exerted in rotating the pinch rolls pulls the upper roll down toward the lower roll to grip and feed the material through the tube.

11 Claims, 4 Drawing Figures

SCRAP CUTTER MACHINE

BACKGROUND OF THE INVENTION

This invention relates to a scrap cutter machine for cutting elongated pieces of material, such as steel strapping, wire or plastic, into short lengths for storage or disposal.

Various types of mechanisms have heretofore been proposed for cutting steel strapping and the like into short lengths but in general such devices have been unduly complicated and expensive and the feed mechanisms have given difficulty in view of the frequent disorderly condition of the material being handled. A strong pulling action is often necessary to feed the material.

Objects of the present invention are, therefore, to provide an improved scrap cutter machine, to provide a machine of the type described having an improved feed mechanism, to provide a machine having a pinch roll feed mechanism without springs, to provide a machine having a pinch roll feed mechanism wherein the pinch rolls are closed together by the tension of a drive chain, to provide a machine having pinch rolls operating in a feed tube, and to provide a machine having a cutter mounted between two flywheels.

SUMMARY OF THE INVENTION

A motor-driven flywheel shaft mounts a cutter blade between a pair of flywheels. An identical cutter blade forms an anvil at the discharge end of a horizontal feed tube extending between the two flywheels. A stationary feed roller protrudes through an opening in the bottom of the feed tube and a companion feed roller protrudes through an opening in the top of the feed tube to provide a pair of pinch rolls for feeding elongated pieces of material, such as steel strapping, wire or plastic, which is to be cut into short lengths for storage or disposal.

The shafts of the two feed rolls are equipped with sprocket wheels driven by a chain from a sprocket wheel on a feed drive shaft which is driven by the flywheel shaft. The upper feed roll is mounted on a rocker frame having pivotal movement on the feed drive shaft. Chain tension exerted in rotating the pinch rolls pulls the upper roll down against the lower roll to grip and feed the material through the tube.

The invention will be better understood and additional objects and advantages will become apparent from the following description of a preferred embodiment illustrated in the accompanying drawings. Various changes may be made in the details of construction and arrangement of parts and certain features may be used without others. All such modifications within the scope of the appended claims are included in the invention.

DESCRIPTION OF THE PREFERRED EMBODIMENT

Figure 1:
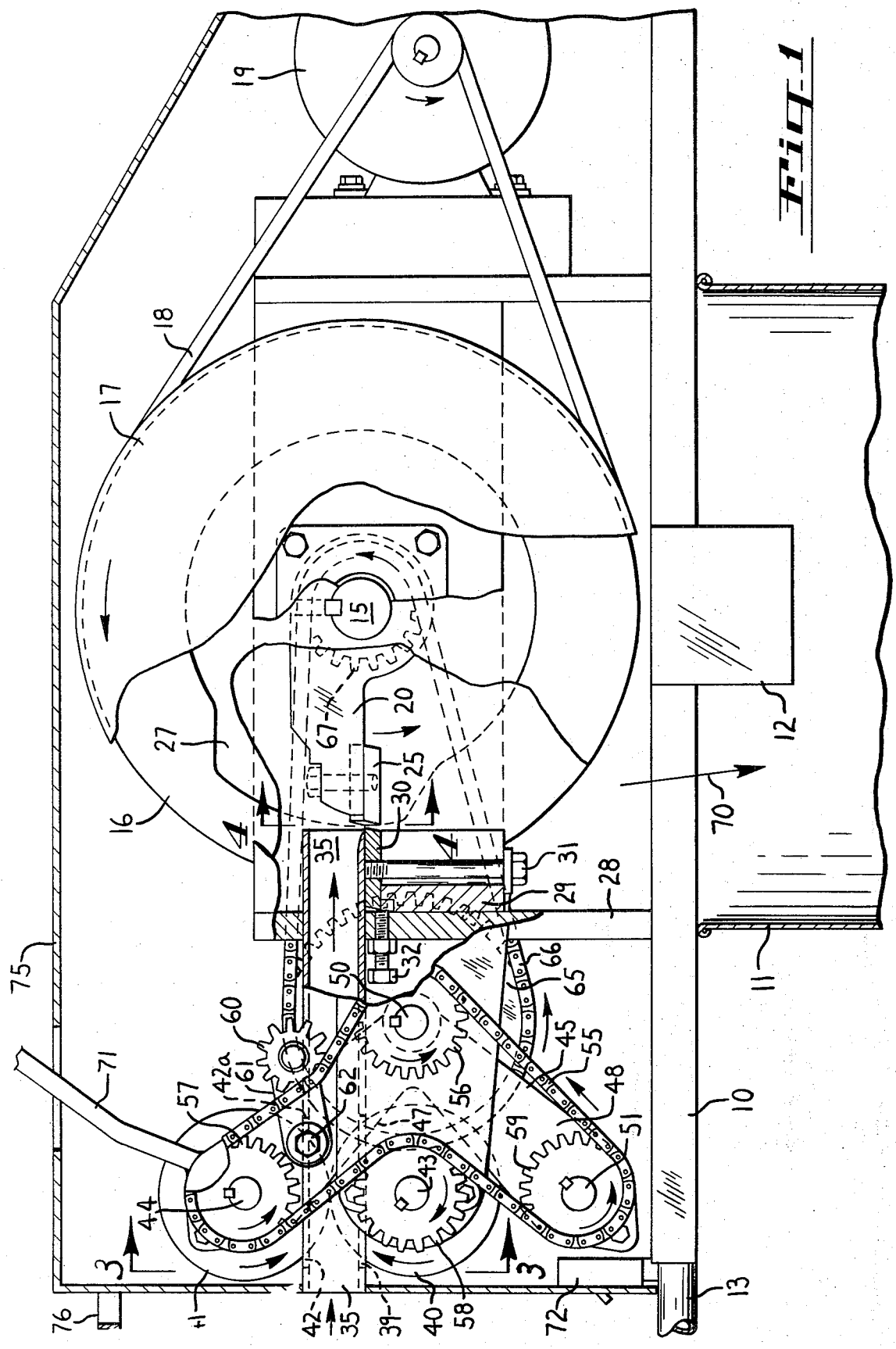
FIG. 1 is a side elevation view with parts broken away, showing a machine embodying the invention.

A main frame 10 is adapted to rest on top of a scrap drum 11. A pair of depending plates 12 on opposite sides of frame 10 project down into drum 11 to hold the frame 10 centered on the top of the drum so that the vibration of the machine will not shift its position. Each of the four corners of frame 10 is equipped with a handle 13 for easy portability whereby the machine may be lifted and carried by two men or merely lifted to replace a filled scrap drum with an empty drum.

Frame 11 supports a flywheel shaft 15 having a pair of flywheels 16. A pulley 17 drives shaft 15 from a belt 18 on a motor 19 mounted on the frame 10.

Figure 2:
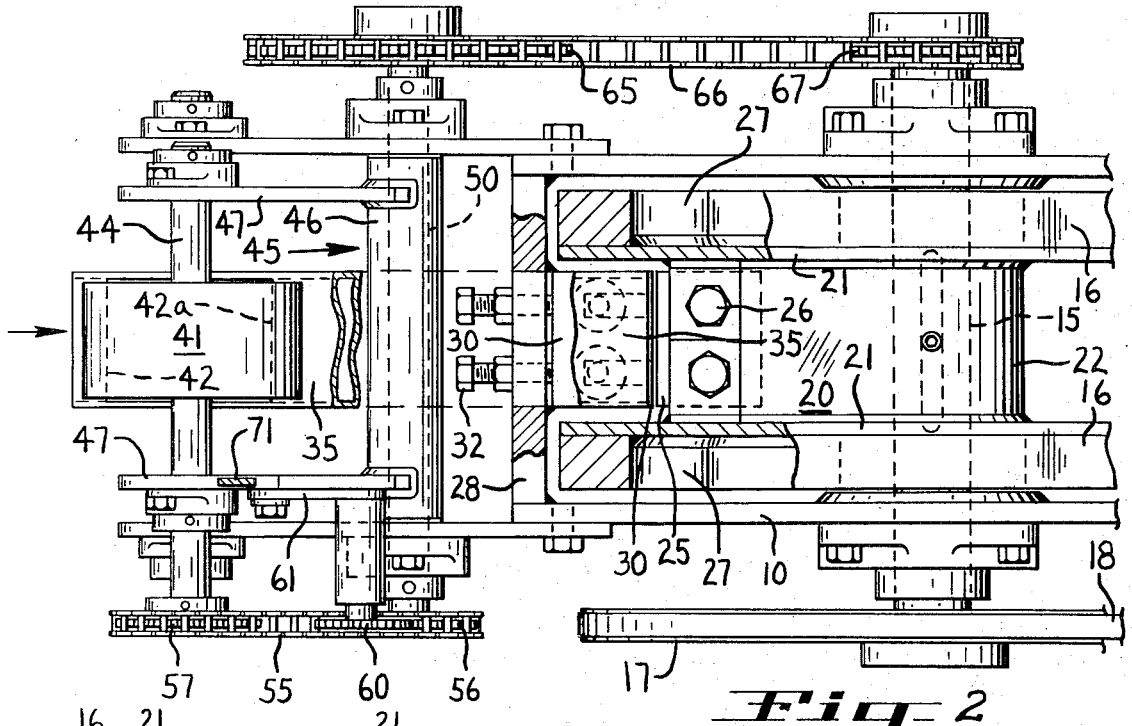
FIG. 2 is a fragmentary top plan view with parts broken away.
Figure 4:
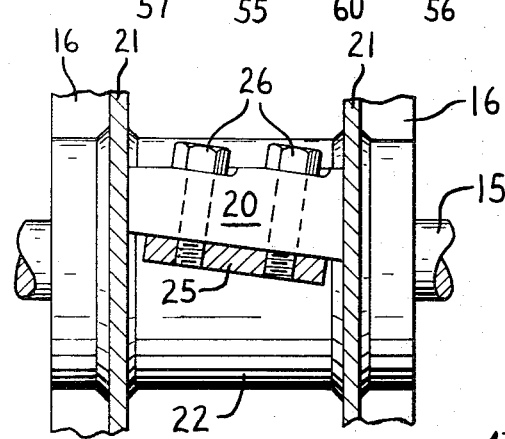
FIG. 4 is a view on the line 4—4 in FIG. 1.
Figure 3:
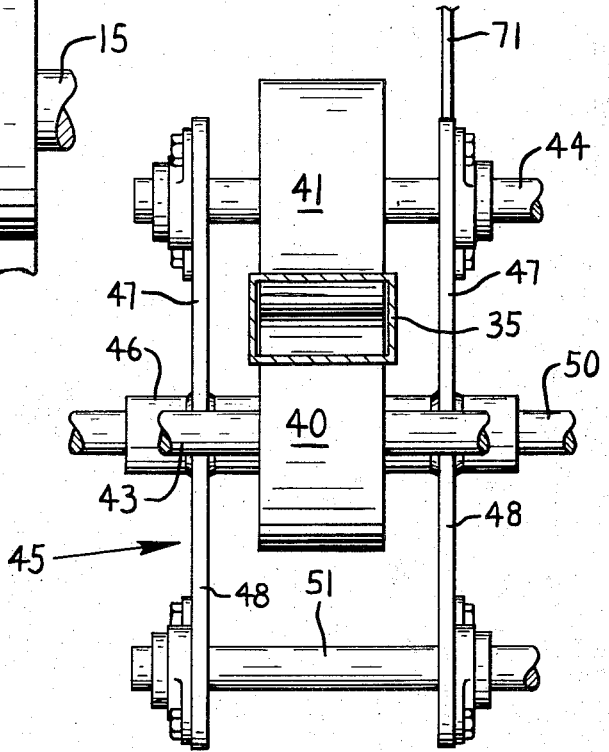
FIG. 3 is a view on the line 3—3 in FIG. 1.

A cutter support 20 is welded between a pair of circular plates 21 which are in turn welded to the confronting faces of the flywheels 16 as shown in FIG. 2. This unitary assembly includes a hub portion 22 which is keyed to the flywheel shaft 15. This assembly further includes a removable cutter blade 25 which is secured to the underside of cutter support 20 by a pair of screws 26. In order to balance this rotary assembly, each flywheel section is reduced at 27 adjacent the cutter support 20.

An upstanding portion 28 on the frame 10 carries an anvil support 29 for a stationary anvil cutter blade 30 which is identical to the rotary cutter blade 25. Cutter blade 30 is secured on anvil support 28 by screws 31 and adjustment toward rotary cutter blade 25 is provided by screws 32.

The cutter blades 25 and 30 are interchangeable, each being sharpened on its two opposite edges. As viewed in FIG. 1, the left edge of cutter blade 25 is effective and the right edge of cutter blade 30 is effective. When these edges become dull from use, the blades may be interchanged before re-sharpening is necessary. When rotary blade 25 is transferred to anvil support 29, the right edge becomes the effective edge and when anvil blade 30 is transferred to cutter support 20, its left edge becomes the effective edge. Thus, by simple transposition, the blades give twice the normal service before resharpening becomes necessary. Also, blade 25 may be turned over on support 20 and blade 30 may be turned over on support 29 to provide reversibility without interchanging the blades.

Anvil blade 30 underlies the discharge end of a rectangular feed tube 35 which is welded in an opening in the upright frame member 28 and extends between the two flywheels. Near the inlet end of feed tube 35 its bottom wall is provided with an opening 39 for a pinch roll 40 in fixed position which projects up into the feed tube. In a similar manner, a movable pinch roll 41 projects downward through an opening 42 in the top wall of feed tube 35 whereby the two pinch rolls are adapted to grip and feed scrap material through tube 35 for cutting into short lengths by cutter blades 25 and 30.

As shown in FIG. 1, feed tube 35 has smooth continuous walls from its inlet end to its discharge end, except for said pinch roll openings 39 and 42, to confine and guide scrap fed through the tube by pinch rolls 40 and 41. As the scrap passes out of the discharge end of feed tube 35, it is confined laterally between circular plates 21 on the flywheel shaft as shown in FIG. 2.

Lower pinch roll 40 is mounted on a shaft 43 journalled in stationary bearings on the machine frame 10.

Upper pinch roll 41 is mounted on a shaft 44 journalled in bearings on a pivotal rocker frame 45. Rocker frame 45 comprises a pair of V-shaped arms welded on opposite ends of a tube 46 which is pivotally mounted on a feed drive shaft 50 in the frame 10. As viewed in FIG. 1, shaft 44 is mounted on upper arms 47 of the V and a shaft 51 extends between the lower arms of the V. There is a pair of upper arms 47 and a pair of lower arms 48 on opposite sides of feed tube 35 to support the shafts 44 and 51.

An endless chain 55 is trained around a drive sprocket 56 on shaft 50, a driven sprocket 57 on shaft 44, a driven sprocket 58 on shaft 43 and an idler sprocket 59 on shaft 51. Sprocket 58 creates a bight in the chain between sprockets 57 and 59 allowing rocker frame 45 to pivot up and down. The chain also engages a chain tightener sprocket 60 mounted on a stub shaft on an arm 61 on one of the upper rocker frame arms 47. Arm 61 is secured in adjusted position by a screw 62 in the arm 47.

Referring back to FIG. 2, shaft 50 is driven by a sprocket wheel 65 having a chain 66 on a sprocket wheel 67 on flywheel shaft 15. Thus, the feed rate of pinch rolls 40 and 41 is controlled directly by flywheel shaft 15 which carries the rotary cutter 25.

With chain 55 travelling in the direction indicated by the arrows in FIG. 1, it will be apparent that the downward chain tension on sprocket 57 tends to pull the upper pinch roll 41 down against the lower pinch roll so as to exert a firm grip on any scrap material introduced into the left end of feed tube 35 whereby such material is fed at a uniform rate to the rotary cutter blade 25. This makes the cut off pieces of scrap of uniform length, each piece being discharged downwardly into scrap drum 11 as indicated by arrow 70. When resistance to the feed of the material is encountered, the chain tension in chain 55 is increased, pulling upper pinch roll 41 down with greater force to grip the material more firmly against lower pinch roll 40.

A handle 71 on rocker frame 45 allows the upper pinch roll 41 to be lifted out of feed tube 35 whenever it is desired to clear the feed tube. A switch 72 is mounted on frame 10 to start and stop the motor 19. The operating mechanism is enclosed within a removable cover 75 which may be lifted off by means of handles 76 at its opposite ends.

The rocker arm assembly 45 moving about pivotal axis point 50 allows feed roll 41 to move upward and out of feed tube 35 in such a manner as to maintain a constant minimal clearance between said roller and the rear end of feed tube slot opening 42 at 42a. This maintenance of opening clearance prevents escapement of material from the feed tube as it is fed toward the cutter and anvil. Only by specific configuration of the rocker assembly in relation to the feed tube may this minimal clearance be maintained; specifically, only when the rear edge 42a of the opening in the feed tube is on a line passing through the center lines of shafts 44 and 50, as will be apparent in FIG. 1.

Having now described my invention and in what manner the same may be used, what I claim as new and desire to protect by Letters Patent is:

1. A scrap cutter machine comprising a feed tube, a stationary cutter blade mounted adjacent the discharge end of said feed tube, a rotary cutter blade cooperating with said stationary cutter blade to cut scrap as it emerges from said feed tube, a lower driven pinch roll having an upper portion projecting into said feed tube through an opening in an underside of said feed tube, an upper driven pinch roll movable toward and away from said lower pinch roll and having a lower portion projecting into said feed tube through an opening in an upper side of the feed tube, and drive means for said pinch rolls operable to move said upper pinch roll downward toward said lower pinch roll, said drive means including a feed drive shaft parallel to said pinch rolls having a drive sprocket, a V-shaped rocker frame mounted for pivotal movement about the axis of said feed drive shaft, said rocker frame having a pair of upper arms on opposite sides of said feed tube carrying a shaft in said upper pinch roll and a pair of lower arms on opposite sides of said feed tube carrying a shaft having an idler sprocket, a sprocket on said upper pinch roll shaft, a drive chain trained around said three sprockets, and a shaft in said lower pinch roll having a sprocket forming a bight in said drive chain between said upper pinch roll sprocket and said idler sprocket, said drive chain moving downward between said upper pinch roll sprocket and said idler sprocket to produce said downward movement of said upper pinch roll.

2. A machine as defined in claim 1 including a handle on said rocker frame for raising said upper pinch roll.

3. A machine as defined in claim 1 including a chain tightener idler sprocket on one of said arms.

4. A machine as defined in claim 1, said rotary cutter blade being mounted on a flywheel shaft, said flywheel shaft driving said feed drive shaft, and a motor driving said flywheel shaft.

5. A machine as defined in claim 4, said rotary cutter blade being mounted between a pair of flywheels on said flywheel shaft.

6. A machine as defined in claim 1, said stationary and rotary cutter blades being identical for interchangeability and each blade being sharpened on two opposite edges for reversibility.

7. A machine as defined in claim 1 including a machine frame adapted to rest on a receiving drum for cut scrap, a pair of depending plates on opposite sides of said frame arranged to center the frame on the drum, and carrying handles on opposite ends of said frame.

8. A scrap cutter machine comprising a flywheel shaft having a pair of radial circular plates thereon, a rotary cutter blade extending lengthwise of said shaft between said plates and having a radius of rotation less than the radius of said plates, a scrap feed tube having a discharge end extending radially between said plates, a stationary anvil cutter blade between said plates at said discharge end of said feed tube, a lower driven pinch roll having an upper portion projecting into said feed tube through an opening in an underside of said feed tube, an upper driven pinch roll movable toward and away from said lower pinch roll and having a lower portion projecting into said feed tube through an opening in an upper side of the feed tube, and an inlet end on said feed tube, said feed tube having smooth continuous walls from said inlet end to said discharge end except for said pinch roll openings to confine and guide scrap fed through the tube by said pinch rolls, and said scrap being confined laterally between said circular plates as it passes out of said discharge end of said feed tube.

9. A machine as defined in claim 8, said circular plates comprising a pair of flywheels.

10. A machine as defined in claim 8 including a feed drive shaft parallel with said pinch rolls between said pinch rolls and said flywheel shaft, and a rocker frame mounted for pivotal movement about the axis of said feed drive shaft and having a pair of arms on opposite sides of said feed tube carrying a shaft in said upper pinch roll.

11. A machine as defined in claim 10, the rear edge of said opening in said upper side of said feed tube being approximately on a line through the center lines of said feed drive shaft and said shaft in said upper pinch roll.

* * * * *